US008422570B2

(12) United States Patent
Beaulieu et al.

(10) Patent No.: US 8,422,570 B2
(45) Date of Patent: Apr. 16, 2013

(54) SYSTEMS AND METHODS FOR OFDM TRANSMISSION AND RECEPTION

(75) Inventors: Norman C. Beaulieu, Edmonton (CA); Peng Tan, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 700 days.

(21) Appl. No.: 11/665,311

(22) PCT Filed: Oct. 13, 2005

(86) PCT No.: PCT/CA2005/001560
§ 371 (c)(1), (2), (4) Date: Apr. 13, 2007

(87) PCT Pub. No.: WO2006/039799
PCT Pub. Date: Apr. 20, 2006

(65) Prior Publication Data
US 2008/0095267 A1 Apr. 24, 2008

Related U.S. Application Data

(60) Provisional application No. 60/617,637, filed on Oct. 13, 2005.

(51) Int. Cl.
*H04K 1/10* (2006.01)
(52) U.S. Cl.
USPC ........... 375/260; 375/299; 375/324; 375/341; 375/262; 375/349
(58) Field of Classification Search ............ 375/260, 375/299, 324, 341, 262, 349
See application file for complete search history.

(56) References Cited

U.S. PATENT DOCUMENTS

| | | | | |
|---|---|---|---|---|
| 6,928,047 | B1 * | 8/2005 | Xia ............................ | 370/206 |
| 7,251,291 | B1 * | 7/2007 | Dubuc et al. ................ | 375/296 |
| 2002/0196863 | A1 * | 12/2002 | Kaku et al. .................. | 375/285 |
| 2005/0185724 | A1 * | 8/2005 | Wang et al. .................. | 375/260 |
| 2006/0039273 | A1 * | 2/2006 | Gore et al. .................. | 370/208 |
| 2007/0253496 | A1 * | 11/2007 | Giannakis et al. ............ | 375/260 |

OTHER PUBLICATIONS

IEEE Std 802.11a-1999, "Wireless LAN medium access control (MAC) and physical layer (PHY) specifications: High-speed physical layer in the 5 GHz band," 1999; 82 pages.
W.H. Chen, C.H. Smith, and S.C. Fralick, "A fast computational algorithm for the discrete cosine transform," *IEEE Trans. Commun.*, vol. 25, pp. 1004-1009, Sep. 1977.
Zhongde Wang, "Fast algorithms for the discrete w transform and for the discrete fourier transform," *IEEE Trans. Acoust., Speech, Signal Processing*, vol. ASSP-32, pp. 803-816, Aug. 1984.
P. Tan and N.C. Beaulieu, "Precise bit error probability analysis of DCT OFDM in the presence of carrier frequency offset on AWGN channels," Global Telecommunications Conference, 2005. GLOBECOM '05. *IEEE* vol. 3, Nov. 28-Dec. 2, 2005 pp. 1429-1434.

(Continued)

*Primary Examiner* — Kabir A Timory

(57) ABSTRACT

A discrete cosine transform (DCT)-based orthogonal frequency-division multiplexing (OFDM) system is provided with a zero-padding guard interval and MMSE reception. The performance of the DCT-OFDM system with the zero-padding guard interval scheme and the minimum mean-square error (MMSE) receiver over time-varying multipath Rayleigh fading channels is investigated. The results show that employing the proposed DCT-OFDM system rather than the conventional DFT-OFDM system can provide better bit error rate performance in practical systems, by as much as 6 dB in signal-to-noise ratio.

19 Claims, 5 Drawing Sheets

OTHER PUBLICATIONS

A.V. Oppenheim, R.W. Schafer, with J.R. Buck, *Discrete-Time Signal Processing, 2nd Ed.*, Peentice Hall, 1998 pp. 595-596.

K.R. Rao, P. Yip, *Discrete Cosine Transform*. Academic Press, 1990 pp. 22, 23, 26 and 27.

G.D. Mandyam, "On the discrete cosine transform and OFDM systems," in *Proc. ICASSP 2003*, 2003, pp. 544-547.

J. Tan and G.L. Stuber, "Constant envelope multi-carrier modulation," in *Proc. MILCOM 2002*, vol. 1, pp. 607-611, 2002.

F. Xiong, "*M*-ary amplitude shift keying OFDM system," *IEEE Trans. Commun.*, vol. 51, pp. 1638-1642, Oct. 2003.

A. Schuchert, R. Hasholzner, and P. Antoine, "A novel IQ imbalance compensation scheme for the reception of OFDM signals," *IEEE Trans. Consumer Electron.*, vol. 47, pp. 313-318, Aug. 2001.

A. Peled and A. Ruiz, "Frequency domain data transmission using reduced computational complexity algorithms," in *Proc. IEEE Int. Conf. Acoust., Speech, Signal Processing*, 1980, pp. 964-967.

S.A. Martucci, "Symmetric convolution and the discrete sine and cosine transform," *IEEE Trans. Signal Processing*, vol. 42, pp. 1038-1051, May 1994.

B. Muquet, Z. Wang, G.B. Giannakis, M. Courville, and P. Duhamel, "Cyclic prefixing or zero padding for wireless multicarrier transmissions?," *IEEE Trans. Commun.*, vol. 50, pp. 2136-2148, Dec. 2002.

J.G. Proakis, *Digital Communications*, 4th ed, ser. Electrical and Computer Engineering. New York: McGraw-Hill, 2000 pp. 602.

D.J. Young and N.C.Beaulieu, "The generation of correlated Rayleigh random variates by inverse discrete Fourier transform," *IEEE Trans. Commun.*, vol. 48, pp. 1114-1127, Jul. 2000.

Y.S. Choi, P.J. Voltz and F.A. Cassara, "On channel estimation and detection for multicarrier signals in fast and selective Rayleigh fading channels," *IEEE Trans. Commun.*, vol. 49, pp. 1375-1387.

X. Cai and G.B. Giannakis, "Bounding performance and suppressing intercarrier interference in wireless mobile OFDM," *IEEE Trans. Commun.*, vol. 51, pp. 2047-2056.

P. Tan and N.C. Beaulieu, "An Improved DCT-Based OFDM Data Transmission Scheme", PIMRC 2005. IEEE 16th International Symposium on Personal, Indoor and Mobile Radio Communications, 2005. vol. 2, Sep. 11-14, 2005 pp. 745-749.

P. Tan and N.C. Beaulieu, "A Comparison of DCT-Based OFDM and DFT-Based OFDM in Frequency Offset and Fading Channels", IEEE Transactions on Communications, vol. 54, No. 11, Nov. 2006, pp. 2113-2125.

ETSI Normalization Committee, "Channel models for HIPERLAN/2 in different indoor scenarios," European Telecommunications Standards Institute, Sophia-Antipolis, France, Document 3ERI085B, Mar. 30, 1998; 8 pages.

\* cited by examiner

SYSTEMS AND METHODS FOR OFDM TRANSMISSION AND RECEPTION

This application is the National Phase of International Application No. PCT/CA2005/001560 filed on Oct. 13, 2005, which claims priority from U.S. Provisional application No. 60/617,637, which documents are both incorporated herein by reference in their entirety.

FIELD OF THE INVENTION

The invention relates to systems and methods for OFDM transmission and reception.

BACKGROUND OF THE INVENTION

Orthogonal frequency-division multiplexing (OFDM) is being widely used in the physical layer specifications, such as IEEE 802.11a, IEEE 802.16a, and HIPERLAN/2, of many broadband wireless access systems. Particularly, IEEE 802.11a, providing data rates ranging from 6 Mbits/s to 54 Mbits/s by a link adaptation scheme with different modulation formats from binary phase shift keying (BPSK) to 64-ary quadrature amplitude modulation (64-QAM), has become a popular computer industry standard for wireless network cards. It is also being used in digital audio broadcasting (DAB) and digital video broadcasting (DVB) systems in Europe. Moreover, AT&T Labs recently demonstrated their fourth-generation (4G) system with OFDM technology for the downlink. OFDM technology can find its way to these applications because of its wideband nature and the ability to effectively convert a frequency selective fading channel into several nearly flat fading channels.

In discrete Fourier transform (DFT) OFDM, intersymbol interference (ISI) can be completely canceled by using the cyclic prefix (CP) scheme provided the CP is longer than the channel impulse response (CIR). See A. Peled and A. Ruiz, "Frequency domain data transmission using reduced computational complexity algorithms," in *Proc. IEEE Int. Conf. Acoust., Speech, Signal Processing*, 1980, pp. 964-967. In addition, if the carrier frequency is synchronized perfectly, and the CIR does not vary in one OFDM frame, there will be no intercarrier interference (ICI) components in the received signals. Therefore, one can use a one-tap equalizer in the receiver to compensate the channel distortion. Actually, the CP scheme works because of the fact that the DFT of the circular convolution of two sequences is equal to the multiplication of the DFTs of these two sequences. See A. V. Oppenheim, R. W. Schafer, with J. R. Buck, *Discrete-Time Signal Processing*, 2nd Ed., Prentice Hall, 1998. DFT-OFDM can not guarantee symbol recovery if the channel transfer function has zero(s) on the FFT grid.

As an alternative to use of the CP, a zero padding (ZP) scheme can be used in DFT-OFDM. A ZP scheme can provide ISI-free transmission if the length of channel impulse response is less than the length of the ZP. This scheme ensures symbol recovery regardless of the channel zero locations.

The above mentioned systems are discrete Fourier transform (DFT)-based multicarrier modulations (MCMs) where the complex exponential functions set is employed as an orthogonal basis.

An alternative to a DFT-based OFDM system is a system employing another orthogonal basis, namely a single set of cosinusoidal functions $\cos(2\pi n F_A t)$ where $n=0, 1, \ldots, N-1$ and $0 \leq t < T$, to implement the multicarrier modulation scheme. The minimum $F_A$ required to satisfy the orthogonality condition $$\int_0^T \sqrt{\frac{2}{T}} \cos(2\pi k F_\Delta t) \sqrt{\frac{2}{T}} \cos(2\pi m F_\Delta t) dt = \begin{cases} 1, & k = m \\ 0, & k \neq m \end{cases} \quad (1)$$

is ½ T Hz. This scheme can be synthesized using a discrete cosine transform (DCT). This scheme will be denoted as DCT-OFDM, and the conventional OFDM system as DFT-OFDM. As far as fast implementation algorithms are concerned, the fast DCT algorithms proposed in W. H. Chen, C. H. Smith, and S. C. Fralick; "A fast computational algorithm for the discrete cosine transform," *IEEE Trans. Commun.*, vol. 25, pp. 1004-1009, September 1977 and Zhongde Wang, "Fast algorithms for the discrete w transform and for the discrete Fourier transform," *IEEE Trans. Acoust., Speech, Signal Processing*, vol. ASSP-32, pp. 803-816, August 1984 could provide fewer computational steps than fast Fourier transform (FFT) algorithms.

Unfortunately, in general, the DCT does not have the circular convolution multiplication property. Inserting the CP scheme directly into the proposed DCT-OFDM system does eliminate ISI. However, as a side effect, ICI is introduced even when the CIR does not change in one DCT-OFDM frame.

In K. R. Rao, P. Yip, *Discrete Cosine Transform*. Academic Press, 1990 and S. A. Martucci, "Symmetric convolution and the discrete sine and cosine transform," *IEEE Trans. Signal Processing*, vol. 42, pp. 1038-1051, May 1994 it was suggested that when the given sequences are evenly symmetrically extended, a circular convolution property similar to the DFT can be found. By employing this property, a DCT-based OFDM system is proposed in G. D. Mandyam, "On the discrete cosine transform and OFDM systems," in *Proc. ICASSP 2003*, pp. 544-547. However, the symmetric extension of the original data sequence reduces the data transmission efficiency by at least one-half.

SUMMARY OF THE INVENTION

According to one broad aspect, the invention provides an OFDM transmitter adapted to, during each OFDM symbol interval, map data symbols to orthogonal sub-carriers of the form $\cos(2\pi n F_A t)$ where $n=0, 1, \ldots, N-1$ and $0 \leq t < T$, and to insert zeros after each OFDM symbol interval.

In some embodiments, a system comprises the OFDM transmitter and a receiver adapted to, during each OFDM symbol interval, recover estimates of the data symbols transmitted by the OFDM transmitter.

In some embodiments, the receiver is adapted to perform MMSE estimation to recover the estimates.

In some embodiments, the OFDM transmitter comprises: an inverse discrete cosine transform that produces a time domain output for each OFDM symbol interval in which data symbols are mapped to the sub-carriers; and a zero padding function adapted to insert zeros after each OFDM symbol interval.

In some embodiments, the inverse discrete cosine transform is an N-point IDCT that produces N time domain samples; the zero padding function inserts G zeros after each set of N time domain samples, where G is selected to substantially eliminate ISI between consecutive OFDM symbols after transmission over a channel.

In some embodiments, G is selected to be greater than or equal to a length of a channel impulse response for the channel.

In some embodiments, the receiver performs MMSE estimation in accordance with:

$$\hat{X}(i) = DH^H(HH^H + \sigma^2 I_M)^{-1}\bar{R}(i) \quad (13)$$
$$= D(H^H H + \sigma^2 I_N)^{-1}H^H \bar{R}(i)$$

where $I_M$ is an M×M identity matrix, $\hat{X}(i)$ is the MMSE estimate, $H=H_0 C_{zp}$, where $H_0$ is a channel matrix, and $C_{zp}$ is a zero padding matrix, D is a matrix representation of the discrete cosine transform, M is a sequence length including zero padding, and N is a sequence length not including zero padding, $(*)^H$ is a conjugate transpose operation, and $\sigma^2$ is an additive white noise Gaussian noise variance.

In some embodiments, the system comprises a one dimensional modulation and demodulation scheme.

In some embodiments, the system comprises a two dimensional modulation and demodulation scheme.

According to another broad aspect, the invention provides a method comprising: during each OFDM symbol interval, mapping data symbols to orthogonal sub-carriers of the form $\cos(2\pi n F_\Delta t)$ where n=0, 1, . . . , N−1 and $0 \leq t < T$; and inserting zeros between consecutive OFDM symbol intervals and transmitting a resulting signal.

In some embodiments, the method further comprises: at a receiver, receiving the resulting signal over a channel, and during each OFDM symbol interval processing the resulting signal received over the channel to recover estimates of the data symbols.

In some embodiments, processing comprises performing MMSE estimation.

In some embodiments, mapping comprises performing an inverse discrete cosine transform to produce a time domain output for each OFDM symbol interval in which data symbols are mapped to the sub-carriers.

In some embodiments, the inverse discrete cosine transform is an N-point IDCT that produces N time domain samples; inserting zeros comprises inserting G zeros after each set of N time domain samples, where G is selected to substantially eliminate ISI between adjacent OFDM symbols after transmission over the channel.

In some embodiments, the MMSE estimation is performed in accordance with:

$$\hat{X}(i) = DH^H(HH^H + \sigma^2 I_M)^{-1}\bar{R}(i) \quad (13)$$
$$= D(H^H H + \sigma^2 I_N)^{-1}H^H \bar{R}(i)$$

where $I_M$ is an M×M identity matrix, $\hat{X}(i)$ is the MMSE estimate, $H=H_0 C_{zp}$, where $H_0$ is a channel matrix, and $C_{zp}$ is a zero padding matrix, D is a matrix representation of the discrete cosine transform, M is a sequence length including zero padding, and N is a sequence length not including zero padding, $(*)^H$ is a conjugate transpose operation, and $\sigma^2$ is an additive white noise Gaussian noise variance.

In some embodiments, the method further comprises: performing one dimensional modulation and demodulation.

In some embodiments, the system comprises: performing two dimensional modulation and demodulation.

According to another broad aspect, the invention provides a receiver adapted to, during each OFDM symbol interval: receive a signal comprising data symbols mapped to orthogonal sub-carriers of the form $\cos(2\pi n F_\Delta t)$ where n=0, 1, . . . , N−1 and $0 \leq t < T$, and having a zero guard band between consecutive symbol intervals, the guard band having a duration selected to substantially eliminate ISI between consecutive symbols after transmission over a channel; and during each OFDM symbol interval, perform MMSE estimation to recover estimates of the data symbols.

In some embodiments, the receiver is adapted to perform demodulation of a one dimensional modulation scheme.

In some embodiments, the receiver is adapted to perform demodulation of a two dimensional modulation scheme.

DETAILED DESCRIPTION OF THE PREFERRED EMBODIMENTS

Figure 1:
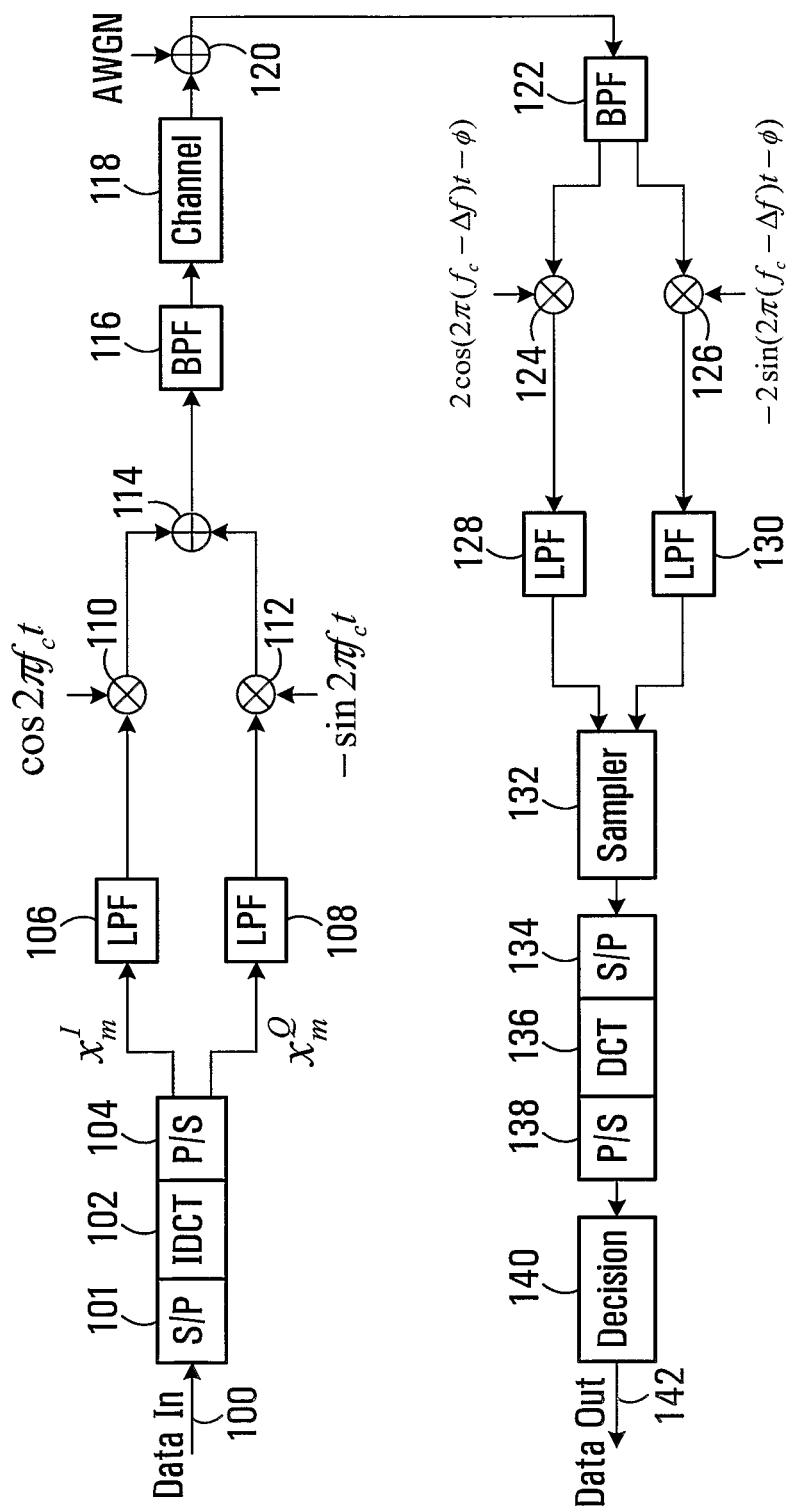
FIG. 1 is a block diagram of a DCT-based orthogonal frequency-division multiplexing system.

The intercarrier interference (ICI) analysis and the exact bit error rate performance comparisons in the presence of frequency offset between the DCT-OFDM system and the DFT-OFDM system in applicants paper P. Tan and N. C. Beaulieu, "Precise bit error probability analysis of DCT OFDM in the presence of carrier frequency offset on AWGN channels," to appear in GLOBECOM05, Nov. 28-Dec. 2, 2005 hereby incorporated by reference in its entirety, have shown that the DCT-OFDM scheme can be more robust to frequency offset than the conventional DFT-OFDM scheme due to the energy compaction property of the DCT described in A. V. Oppenheim, R. W. Schafer, with J. R. Buck, *Discrete-Time Signal Processing*, 2nd Ed., Prentice Hall, 1998; that is, the signal energy is concentrated in a few low-index DCT coefficients while the remaining coefficients are zero or are negligibly small. In this regard, it has been shown that the DCT is close to optimal in terms of energy compaction capabilities. See K. R. Rao, P. Yip, *Discrete Cosine Transform*. Academic Press, 1990. In other studies about DCT-OFDM, it is proposed that by feeding a symmetrically extended sequence into a DCT-OFDM system, in the case of static and exponentially decaying channel profiles with intersymbol interference (ISI), the throughput lower bound of the DCT-based OFDM system is higher than that of the DFT-based OFDM system. See G. D. Mandyam, "On the discrete cosine transform and OFDM systems," in *Proc. ICASSP* 2003, 2003, pp. 544-547. As a side effect, the data transmission efficiency of that scheme will be decreased by at least one-half. In addition, the static channel assumption usually does not hold in real wireless transmission environments. A more meaningful performance measure in practical digital wireless communications systems, bit error rate (BER), is not examined in that work. Considering there is a bandwidth advantage for a DCT-based system, in J. Tan and G. L. Stüber, "Constant envelope multi-carrier modulation," in *Proc. MILCOM* 2002, vol. 1, pp. 607-611, 2002 a DCT, rather than a DFT, was used to implement multicarrier modulation in their constant envelope MCM system. Based on the same idea, F. Xiong, "M-ary amplitude shift keying OFDM system," *IEEE Trans. Commun.*, vol. 51, pp. 1638-1642, October 2003, it was proposed to use a coherent $\sqrt{M}$-ary amplitude shift keying OFDM system instead of the M-ary QAM OFDM system.

An embodiment of the invention provides a DCT-OFDM system that features the use of a zero-padding guard interval scheme employed in combination with a minimum mean-square error (MMSE) receiver. In some implementations, the new scheme can not only eliminate the ISI but also avoid decreasing the transmission efficiency.

System Model

In a DCT-OFDM system, input bits are first mapped into symbols based on a specific signaling format in a data encoder. Then N symbols are serial-to-parallel (S/P) converted into N low-rate data streams. The ith parallel symbol block is denoted as a vector $$\vec{X}(i) = [d_0^i d_1^i \ldots d_{N-1}^i]^T \qquad (2)$$

where $[x]^T$ denotes transposition. With the introduction of a zero-padding interval longer than the channel impulse response, the intersymbol interference (ISI) or inter-block interference (IBI) in OFDM system can usually be ignored. For the sake of notational convenience, the superscript i is temporarily omitted since only the ith data block is considered currently. The N symbols $\{d_k\}_{k=0}^{N-1}$, each with time duration T, are then multiplexed by modulating corresponding subcarriers. Unlike conventional OFDM, here the set $\cos(2\pi n F_\Delta t)$, $n=0, \ldots, N-1$ and $0 \leq t < T$ is used as subcarriers to implement the multicarrier modulation. To maintain the orthogonality, the subcarriers need a minimum frequency spacing $F_\Delta$ of ½ T Hz. The multiplexed signal x(t) can be written as $$x(t) = \sum_{n=0}^{N-1} d_n g_n \cos(n\pi t/T) \qquad (3a)$$

where $$g_n = \begin{cases} \sqrt{1/N}, & n = 0 \\ \sqrt{2/N}, & n = 1, 2, \ldots, N-1. \end{cases} \qquad (3b)$$

Sampling the continuous time signal x(t) at time instants $t_m$ where $$t_m = \frac{T(2m+1)}{2N}, m = 0, 1, \ldots, N-1 \qquad (4)$$

gives a discrete sequence $$x_m = \sqrt{\frac{2}{N}} \sum_{n=0}^{N-1} d_n \beta_n \cos\left(\frac{\pi n(2m+1)}{2N}\right) \qquad (5a)$$

where $$\beta_n = \begin{cases} 1/\sqrt{2}, & n = 0 \\ 1, & n = 1, 2, \ldots, N-1. \end{cases} \qquad (5b)$$

Eq. (5a) is just the inverse discrete cosine transform (IDCT) which is referred to as IDCT-2 A. V. Oppenheim, R. W. Schafer, with J. R. Buck, *Discrete-Time Signal Processing*, 2nd Ed., Prentice Hall, 1998. The discrete cosine transform (DCT) will restore the original signal $d_n$ as $$d_n = \sqrt{\frac{2}{N}} \beta_n \sum_{m=0}^{N-1} x_m \cos\left(\frac{\pi n(2m+1)}{2N}\right). \qquad (6)$$

FIG. 1 is a detailed block diagram for a DCT-OFDM system including in-phase and quadrature modulators in the presence of carrier frequency offset $\Delta f$ and phase error $\phi$. Because the DCT is a real transform, it is not necessary to use the quadrature modulator for one-dimensional signaling formats, such as BPSK and M-ary pulse amplitude modulation (M-PAM).

Input data 100 is converted to parallel form with serial-to-parallel converter 101. The output of this is processed by IDCT 102 and converted back to serial form at 104. In-phase and quadrature components are filtered in respective low pass filters 106, 108 and then modulated using in-phase and quadrature modulators 110, 112. The output of the modulators is summed at 114 and bandpass filters at 116 and then transmitted over channel 118 where it is assumed that additive white Gaussian noise is added at 120. At the receiver, a received signal is bandpass filtered at 122, demodulated with in-phase and quadrature demodulators 124, 126, low pass filtered at 128, 130 and then sampled at 132. The sampled output is then converted to parallel form at 134, processed by DCT function 136 and converted back to serial form at 138. Functional element 140 represents any decision process taken on the output of the DCT process, and the overall data output is indicated at 142.

Performance over Time-Varying Multipath Rayleigh Fading Channels

Multipath channels will introduce inter-symbol interference (ISI) which can be mitigated by employing a proper ISI-cancellation scheme. Rapid change of channel states, modeled by the Doppler frequency shift, will destroy the orthogonality between subcarriers, and thus gives ICI. Therefore, an equalization scheme should be employed to suppress the ICI.

According to a preferred embodiment of the invention, a zero-padding scheme is employed in a DCT-OFDM system to mitigate ISI, and a MMSE equalizer is used in the receiver to reduce ICI.

Zero-Padding DCT-OFDM

A new zero-padding scheme is provided that can eliminate the ISI and avoid decreasing the transmission efficiency as well.

Let an N×1 vector $\vec{X}(i)$ represent a length N data block transmitted in the ith DCT-OFDM symbol. The N×1 vector $\vec{Y}(i)$ represents the DCT of $\vec{X}(i)$. One may write $$\vec{Y}(i) = D^T \vec{X}(i) \qquad (7)$$

where $D^T$ is the IDCT matrix and D is the DCT matrix for a length-N sequence. The rth ($0 \leq r \leq N-1$) row and cth ($0 \leq c \leq N-1$) column element $D_{r,c}$ of the DCT matrix D is defined as $$D_{r,c} = \sqrt{\frac{2}{N}} \, \beta_r \cos\left(\frac{\pi r(2c+1)}{2N}\right). \tag{8}$$

According to an embodiment of the invention, a length G zero-padding sequence is added after sequence $\vec{Y}(i)$. The new sequence $\vec{Y}'(i)$ will become a zero-padded sequence of length M (M=N+G) given as $$\vec{Y}'(i) = C_{zp}\vec{Y}(i) \tag{9}$$

where $C_{zp} = [I_N \, 0_{N \times G}]^T$ is an M×N zero-padding matrix, and $I_N$ is an N×N identity matrix.

Under a wide-sense stationary uncorrelated scattering (WSSUS) assumption, a frequency selective multipath fading channel can be modeled as a tapped-delay-line (TDL) with L+1 time-varying coefficients $h_0(t)$, $h_1(t)$, and $h_L(t)$.

In preferred implementations, G is selected to be greater than or equal to L, such that there will be no ISI components in the received M×1 fading signal plus noise vector $$\vec{R}(i) = H_0 C_{zp}\vec{Y}(i) + \vec{W}(i) \tag{10}$$
$$= H\vec{Y}(i) + \vec{W}(i)$$

where $H_0$ is the M×M channel convolutional matrix whose element in the rth (0≤r≤M−1) row and cth (0≤c≤M−1) column is $$H_0(r,c) = \begin{cases} h_{r-c}(t), & 0 \leq r-c \leq L \\ 0, & \text{otherwise} \end{cases} \tag{11}$$

and $\vec{W}(i)$ is the AWGN vector with mean zero and variance $\sigma^2$, and where the matrix H is determined by $H_0 C_{zp}$. L can have many values depending on the propagation environment and the data transmission rate. Values from L=3 to L=8 are typical, for current data transmission rates and channels, but L could be 0 and L could be large for some environments and some transmission rates, say L=hundreds. In the HIPER-LAN/2 channel model, one might for example choose G to be greater than L=8 for ZP DCT-OFDM.

In the absence of noise, the zero-forcing equalizer will recover the signal completely according to $$\hat{X}(i) = DH^\dagger \vec{R}(i) \tag{12}$$

where $H^\dagger$ is the pseudo-inverse of matrix H, $H^\dagger = (H^H H)^{-1} H^H$, and $[x]^H$ denotes conjugate transposition. However, ignoring noise is not practical.

Figure 2:
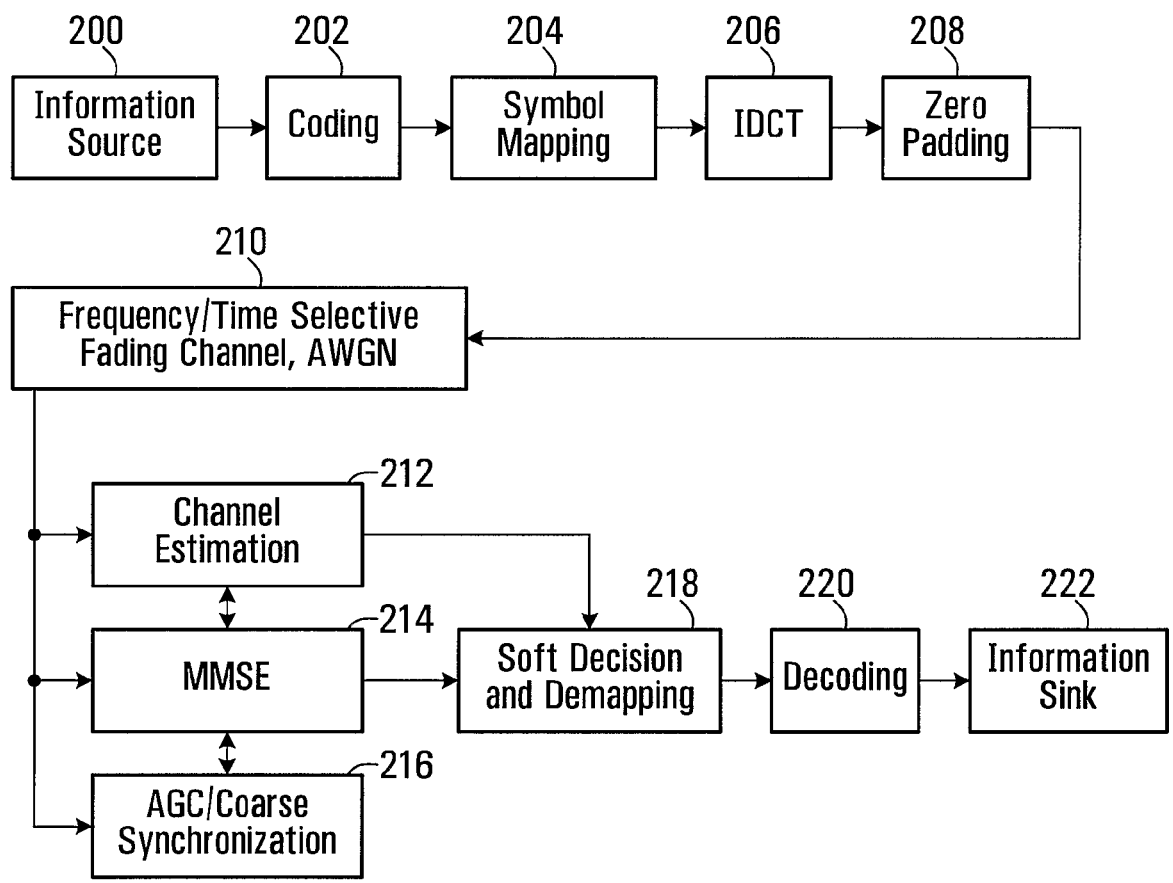
FIG. 2 is a block diagram of a discrete-time baseband model of the MMSE receiver for a zero-padded DCT-OFDM system provided by an embodiment of the invention.

In a preferred embodiment, a MMSE receiver is used to give optimal decision variables, in the sense of minimizing the mean-square error between $\vec{X}(i)$ and $\hat{X}(i)$, as $$\hat{X}(i) = DH^H(HH^H + \sigma^2 I_M)^{-1}\vec{R}(i) \tag{13}$$
$$= D(H^H H + \sigma^2 I_N)^{-1} H^H \vec{R}(i)$$

where $I_M$ is an M×M identity matrix. For two-dimensional signaling formats, both the real and imaginary components of $\hat{X}(i)$ will be used as the decision vector. For one-dimensional signaling formats, the real part of $\hat{X}(i)$ will be used as the decision vector. A discrete-time baseband model of the MMSE receiver for the zero-padded DCT-OFDM is shown in FIG. 2. Note that the discrete cosine transform has been included in the minimum mean-square error estimation component at the receiver end, this being the operation "D" in equation 13.

An information source is indicated at 200. The output of this is subject to coding at 202. The coded output is symbol mapped at 204 and then processed by IDCT 206. The output of IDCT 206 is then zero padded at 208 to produce the overall output that is then transmitted over a frequency/time selective fading channel with AWGN 210. At the receiver, channel estimation 212, MMSE 214, and AGC/coarse synchronization 216 are performed. For a given implementation, one or more of channel estimation and AGC/coarse synchronization may be omitted. In the illustrated example, the output of the MMSE 214 and channel estimation 212 is fed to a soft decision and de-mapping function 218 the output of which is fed to coding function 220 which produces a decoded output that is sent to an information sink 222. In an alternative, the output of the MMSE is used for hard decision decoding.

The functional elements of FIG. 2 can be implemented using any appropriate technology. In one example implementation of a transmitter and receiver using zero padding, for symbols with M non-zero levels, an extra "zero level" is introduced. For example, in a system with nominally two levels {1A, −1A} the modified symbol set {+1A, −1A, 0} can be used. Level 0 (the zero symbol) is transmitted when zeros are padded. Similarly, if the transmitter symbols are {−3A, −1A, +1A, +3A} on each quadrature branch, the symbols {−3A, −1A, 0, +1A, +3A} can be transmitted including sending a symbol when padding a zero.

The following is a particular example of how the zero padding function 208 might operate. The zero padding function 208 receives N parallel outputs from the IDCT 206 over an OFDM symbol duration of T, and produces a serial output of length N+G=M sequence over time T+delta, where delta=T*G/N. To achieve this, the zero padding function converts the N parallel outputs of the IDCT 206 into a serial output of length N over time T, and then pads G zeros over time delta. Note that the IDCT input symbol rate (the rate at which symbols are produced by the symbol mapping 204) also needs to be matched to the new symbol rate that accounts for the zero padding. The system can accommodate an IDCT input symbol rate of N/(T+delta) symbols/s.

A very specific circuit for a DCT-OFDM system has been described. It is to be understood that many different implementations of such a system are possible within the capabilities of one of ordinary skill of the art. More generally, any transmitter design that incorporates the zero padding approach in conjunction with DCT-OFDM signalling is contemplated. In the receiver, any receiver processing that takes into account the zero padding of a transmitted signal, and performs MMSE estimation of DCT-OFDM signals is contemplated.

In another embodiment, a different receiver implementation may be used. Examples of implementations that might be appropriate that are provided in other embodiments include sphere decoding, V-BLAST and maximum likelihood all of which are more complex and expensive than MMSE.

The data is recovered on the basis of the decision vector in systems without coding and in systems using hard decision decoding. In the latter, the data are input to a decoding operation. In systems using soft decision decoding, the decision vector is input directly to a decoding operation.

Equation 13 provides a MMSE receiver for a very specific application. It is to be understood that a receiver may implement this equation using any number of available techniques. Examples include but are not limited to hardware, software, ASICs, FPGAs, DSPs, or any combination of such devices. Also, depending upon assumptions made regarding the channel, and the nature of the signals transmitted, the MMSE receiver may take other forms than that specifically disclosed in equation 13.

In equation 13, "D" represents the discrete cosine transform. This function can be implemented using any available technique. The matrix H is determined by $H_0 C_{zp}$, $C_{zp}$ being the zero padding matrix, and $H_0$ being the channel convolution matrix. It is assumed that the channel impulse response is known and that from this the channel convolution matrix can be generated. It is assumed that the channel estimate is obtained by other means. It is also noted that the form of the MMSE receiver 13 implicitly builds in the stripping of the padded zeros.

Computer Simulations

The bit error rate performance of an uncoded DCT-OFDM system and an uncoded DFT-OFDM system over time-varying multipath Rayleigh fading channels is evaluated in this section. In the case of DFT-OFDM, the DCT matrix D in Eq. (13) should be replaced with the unitary Fourier transform matrix.

The HIPERLAN/2 channel model A defined in ETSI Normalization Committee, "Channel models for HIPERLAN/2 in different indoor scenarios," European Telecommunications Standards Institute, Sophia-Antipolis, France, Document 3ERI085B, Mar. 30, 1998 is employed, which describes the typical transmission environment for a large office with non-line-of-sight propagation, in the simulations. The channel taps $\alpha_i(t)$ are independent and identically distributed zero-mean complex Gaussian random processes. They are generated independently with classical 2-D isotropic scattering omnidirectional receiver antenna Doppler spectrum. The number of subcarriers in these simulations is 64, and the length of the zero-padding is G=16. Since L=8 in the T-spaced TDL model for HIPERLAN/2 channel model A, no ISI occurs in the simulations. All of the simulations assume a fast fading channel, that is, channel state information will change in one OFDM symbol. To ensure the reliability of the computer simulations, $2^{17}$ OFDM symbols are generated to obtain each BER value in the simulations.

Figure 3:
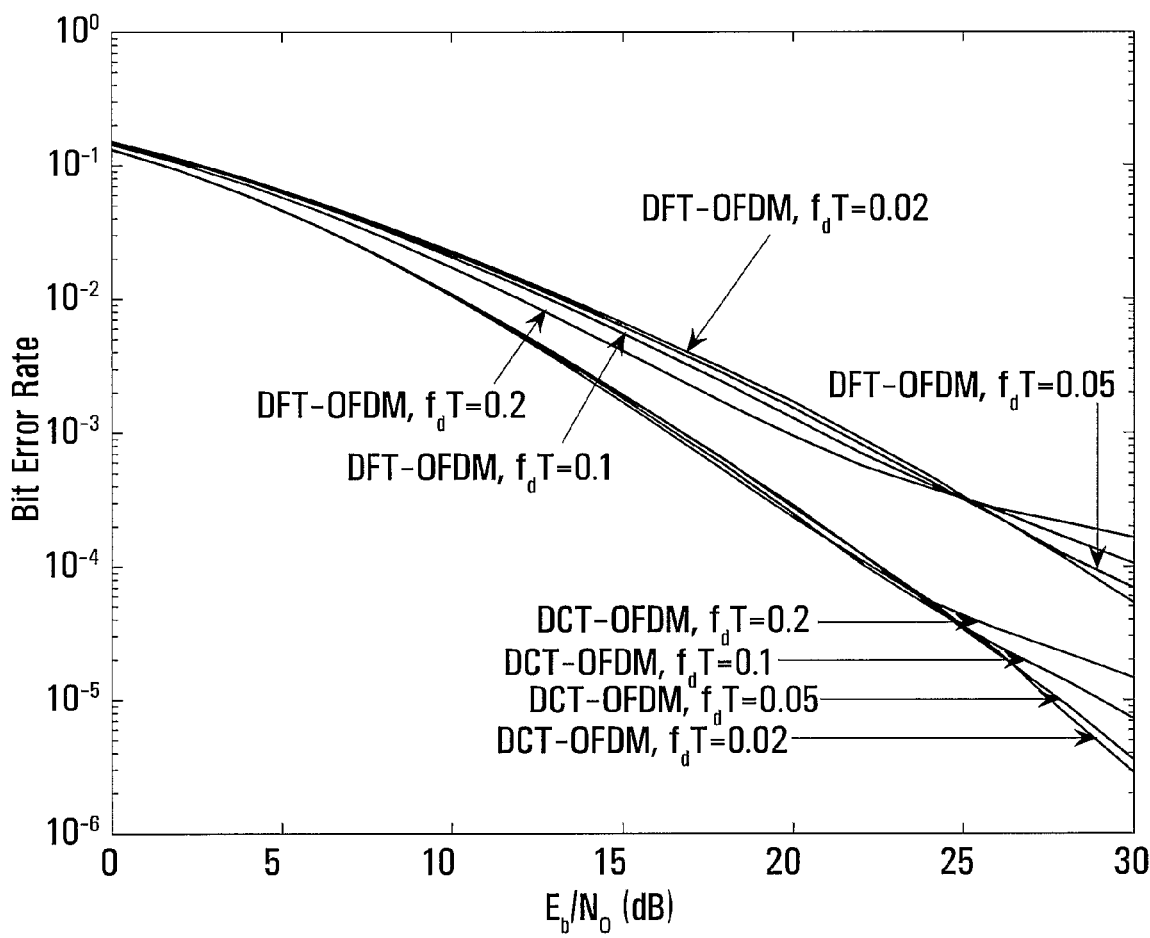
FIG. 3 is a graph of BER performances of the MMSE receiver with perfect channel information for 64-subcarrier DCT-OFDM and 64-subcarrier DFT-OFDM, both with BPSK modulation, over a time-varying multipath Rayleigh fading channel.
Figure 4:
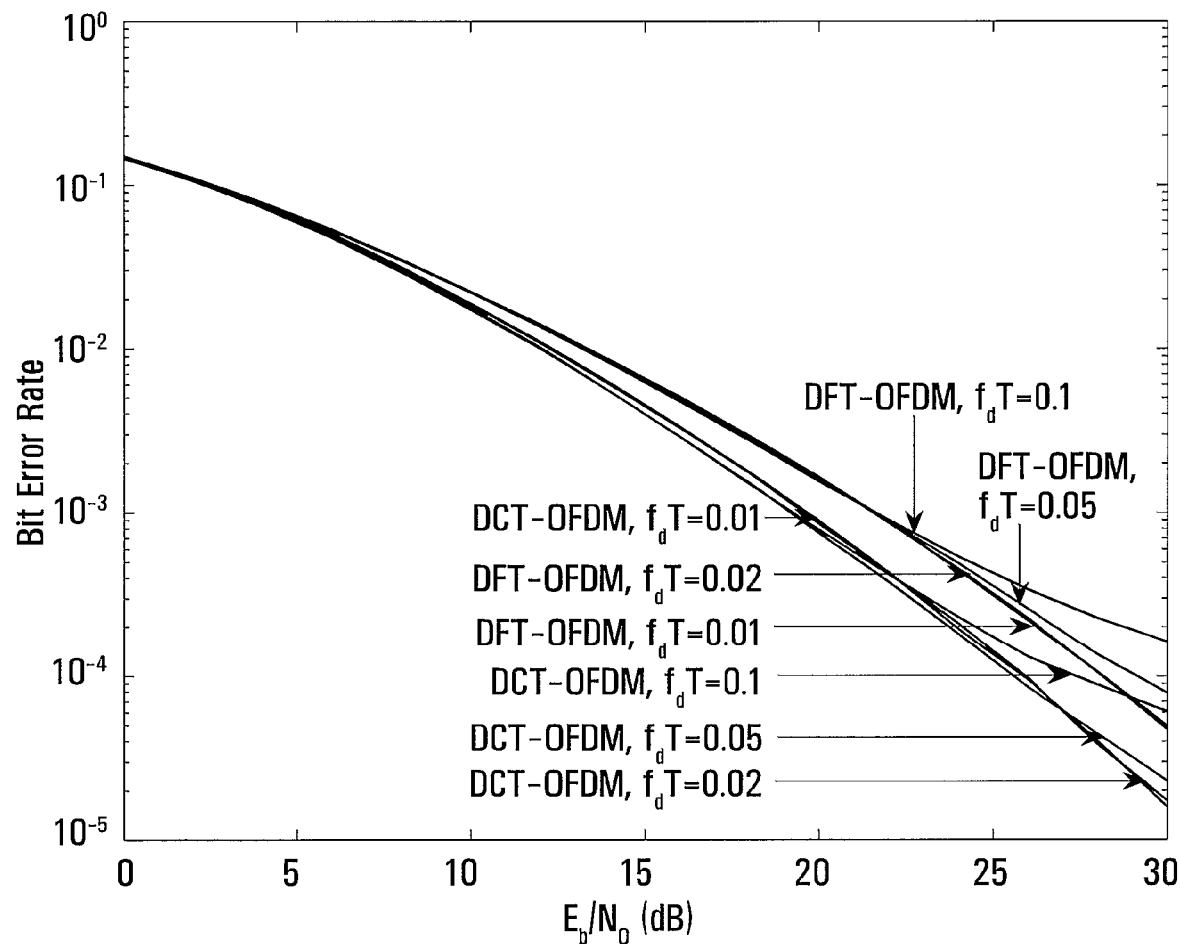
FIG. 4 is a graph of BER performances of the MMSE receiver with perfect channel information for a 64-subcarrier DCT-OFDM and a 64-subcarrier DFT-OFDM, both with BPSK modulation, over a time-varying multipath Rayleigh fading channel.

Under a perfect channel state information assumption, the BER performances of the MMSE receiver for 64-subcarrier DCT-OFDM and 64-subcarrier DFT-OFDM are compared, with BPSK modulation and QPSK modulation, in FIG. 3 and FIG. 4, respectively. One can observe that better BER performance can be achieved with the employment of the proposed DCT-OFDM scheme, rather than the DFT-OFDM scheme in FIG. 3. Particularly, in the case of $f_dT=0.02$, a 5.52 dB gain in SNR over the DFT-OFDM system at a bit error rate of $10^{-4}$ can be achieved by the DCT-OFDM system. In the case of QPSK modulation, in FIG. 4, the BER performances for DCT-OFDM or DFT-OFDM are quite similar in the case of $f_dT=0.01$ and 0.02. However, by using DCT-OFDM, rather than DFT-OFDM in both cases, one can achieve about 2.3 dB gain in SNR at a bit error rate of $10^{-4}$.

Comparing FIG. 3 and FIG. 4, one can see that the BPSK DCT-OFDM achieves a significant performance improvement over the QPSK DCT-OFDM. The reason for this is that there exists interference between the in-phase signal and the quadrature signal in the case of QPSK DCT-OFDM but not in the case of BPSK DCT-OFDM since the discrete cosine transform is a real transform. However, for DFT-OFDM, cross-quadrature interference exists in both cases.

Figure 5:
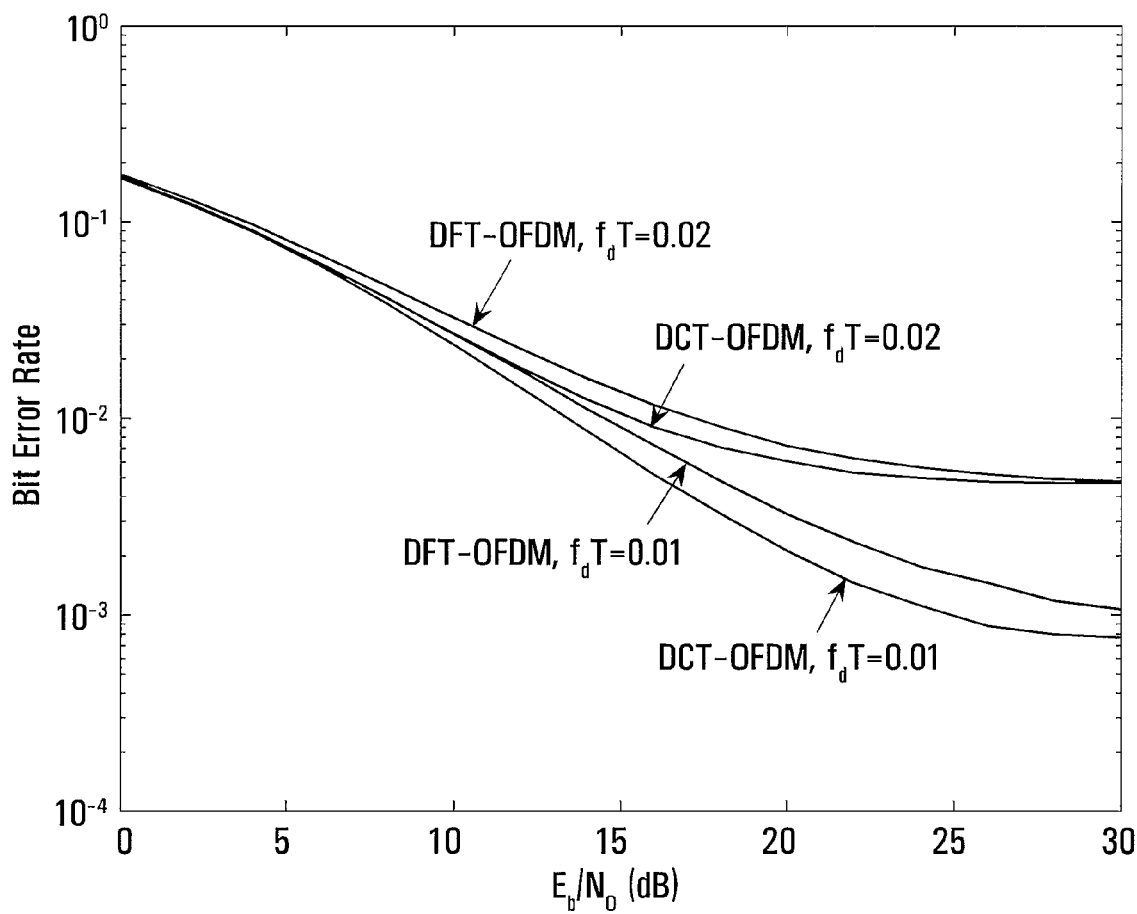
FIG. 5 is a graph of BER performances of the MMSE receiver with channel estimation for a 64-subcarrier DCT-OFDM and a 64-subcarrier DFT-OFDM, both with QPSK, over a time-varying multipath Rayleigh fading channel.

The fast fading channel estimation algorithm defined in Y. S. Choi, P. J. Voltz, and F. A. Cassara, "On channel estimation and detection for multicarrier signals in fast and selective Rayleigh fading channels," *IEEE Trans. Commun.*, vol. 49, pp. 1375-1387, August 2001, where the channel state information of the middle K−1 symbols is obtained from M pilot symbols on both sides by using a Wiener filter method, can be used in the DCT-OFDM system. However, unlike in the above reference, here it is assumed that M pilot symbols are used for the estimation of the latter K−1 symbols. This will reduce the delay introduced by the other algorithm, but greater estimation error may result in this case. FIG. 5 shows the BER performance of the two systems when performing channel estimation with M=P K=1. An error rate floor can be observed in this figure. In particular, in the case of $f_dT=0.01$, DCT-OFDM outperforms DFT-OFDM by about 3.5 dB at a bit error rate of $2\times10^{-3}$.

Numerous modifications and variations of the present invention are possible in light of the above teachings. It is therefore to be understood that within the scope of the appended claims, the invention may be practiced otherwise than as specifically described herein.

We claim:

1. An OFDM transmitter comprising:
an inverse discrete cosine transform (IDCT) functional unit configured to produce a set of time domain samples for each OFDM symbol interval in which data symbols are mapped to a set of N orthogonal sub-carriers of the form $\cos(2\pi n F_A t)$ where n=0, 1, . . . , N−1 and 0≦t<T, where N≧2, $F_A$ is a frequency spacing between subcarriers, T is a time duration of each OFDM symbol interval, wherein the set of time domain symbols $\vec{Y}(i)$ equal $D^T \vec{X}(i)$ where $\vec{X}(i)$ are the data symbols, and wherein $D^T$ is the transpose of an N×N matrix with the element in the cth row and the rth column defined by $$D_{r,c} = \sqrt{\frac{2}{N}} \beta_r \cos\left(\frac{\pi r(2c+1)}{2N}\right)$$

for 0≦r≦N−1, and 0≦c≦N−1, where $$\beta_r = \begin{cases} 1/\sqrt{2}, & r=0 \\ 1, & r=1, 2, \ldots, N-1 \end{cases};$$

and
a zero padding functional unit that for each OFDM symbol interval is configured to insert a contiguous set of zeros in the time domain after the set of time domain samples;
wherein the inverse discrete cosine transform functional unit is an N-point IDCT that produces N time domain samples;
the zero padding functional unit is configured to insert G zeros in the time domain after each set of N time domain samples, where G is selected to substantially eliminate intersymbol interference (ISI) between consecutive OFDM symbols after transmission over a channel, to produce a zero-padded sequence equal to $\vec{Y}'(i)=C_{zp}\vec{Y}(i)$ where $C_{zp}=[I_N\ 0_{N\times G}]^T$ is an M×N zero-padding matrix, and $I_N$ is an N×N identity matrix, and $O_{N\times G}$ is an N×G matrix containing all zeros.

2. A system comprising the OFDM transmitter of claim 1 and a receiver adapted to, during each OFDM symbol interval, recover estimates of the data symbols transmitted by the OFDM transmitter.

3. The system of claim 2 wherein the receiver is adapted to perform MMSE estimation to recover the estimates.

4. The system of claim 1 wherein G is selected to be greater than or equal to a length of a channel impulse response for the channel.

5. The system of claim 3 wherein the receiver performs MMSE estimation in accordance with:

$$\hat{X}(i)=DH^H(HH^H+\sigma^2 I_M)^{-1}$$
$$\vec{R}(i)=D(H^H H+\sigma^2 I_N)^{-1} H^H R(i) \quad (13)$$

where $I_M$ is an M×M identity matrix, $\hat{X}(i)$ is the MMSE estimate, $H=H_0 C_{zp}$, where $H_0$ is a channel matrix, and $C_{zp}$ is a zero padding matrix, D is a matrix representation of the discrete cosine transform, M is a sequence length including zero padding, and N is a sequence length not including zero padding, $(*)^H$ is a conjugate transpose operation, and $\sigma^2$ is an additive white noise Gaussian noise variance.

6. The system of claim 2 comprising a one dimensional modulation and demodulation scheme.

7. The system of claim 2 comprising a two dimensional modulation and demodulation scheme.

8. A method comprising:
during each OFDM symbol interval, performing an inverse discrete cosine transform (IDCT) to produce a set of time domain samples to map data symbols to a set of N orthogonal sub-carriers of the form $\cos(2\pi n F_\Delta t)$ where n=0, 1, . . . , N−1 and 0≦t<T, where N≧2, $F_\Delta$ is a frequency spacing between subcarriers, T is a time duration of each OFDM symbol interval, wherein the set of time domain symbols $\vec{Y}(i)$ equal $D^T X(i)$ where X(i) are the data symbols, and wherein $D^T$ is the transpose of an N×N matrix with the element in the cth row and the rth column defined by $$D_{r,c} = \sqrt{\frac{2}{N}} \beta_r \cos\left(\frac{\pi r(2c+1)}{2N}\right)$$

or 0≦r≦N−1, and 0≦c≦N−1, where $$\beta_r = \begin{cases} 1/\sqrt{2}, & r=0 \\ 1, & r=1,2,\ldots,N-1 \end{cases};$$

and
inserting a contiguous set of G zeros in the time domain after the set of time domain samples and transmitting a resulting signal to produce a zero-padded sequence equal to $\vec{Y}'(i)=C_{zp}\vec{Y}(i)$ where $C_{zp}=[I_N \, 0_{N\times G}]^T$ is an M×N zero-padding matrix, and $I_N$ is an N×N identity matrix, and $O_{N\times G}$ is an N×G matrix containing all zeros.

9. The method of claim 8 further comprising:
at a receiver, receiving the resulting signal over a channel, and during each OFDM symbol interval processing the resulting signal received over the channel to recover estimates of the data symbols.

10. The method of claim 9 wherein processing comprises performing MMSE estimation.

11. The method of claim 8 wherein:
the inverse discrete cosine transform is an N-point IDCT that produces a set of N time domain samples;
inserting zeros comprises inserting G zeros in the time domain after each set of N time domain samples, where G is selected to substantially eliminate ISI between adjacent OFDM symbols after transmission over the channel.

12. The method of claim 10 wherein the MMSE estimation is performed in accordance with:

$$\hat{X}(i)=DH^H(HH^H+\sigma^2 I_M)^{-1}$$
$$\vec{R}(i)=D(H^H H+\sigma^2 I_N)^{-1} H^H R(i) \quad (13)$$

where $I_M$ is an M×M identity matrix, X(i) is the MMSE estimate, $H=H_0 C_{zp}$, where $H_0$ is a channel matrix, and $C_{zp}$ is a zero padding matrix, D is a matrix representation of the discrete cosine transform, M is a sequence length including zero padding, and N is a sequence length not including zero padding, $(*)^H$ is a conjugate transpose operation, and $\sigma^2$ is an additive white noise Gaussian noise variance.

13. The method of claim 9 further comprising:
performing one dimensional modulation and demodulation.

14. The system of claim 9 comprising:
performing two dimensional modulation and demodulation.

15. A receiver adapted to, during each OFDM symbol interval:
receive a received version of a transmitted signal, the transmitted signal comprising a set of time domain samples for each OFDM symbol interval in which data symbols are mapped to a set of N orthogonal sub-carriers of the form $\cos(2\pi n F_\Delta t)$ where n=0, 1, . . . , N−1 and 0≦t<T, where N≧2, $F_\Delta$ is a frequency spacing between subcarriers, T is a time duration of each OFDM symbol interval, wherein the set of time domain symbols $\vec{Y}(i)$ equal $D^T X(i)$ where X(i) are the data symbols, and wherein $D^T$ is the transpose of an N×N matrix with the element in the cth row and the rth column $$D_{r,c} = \sqrt{\frac{2}{N}} \beta_r \cos\left(\frac{\pi r(2c+1)}{2N}\right)$$

for 0≦r≦N−1, and 0≦c≦N−1, where $$\beta_r = \begin{cases} 1/\sqrt{2}, & r=0 \\ 1, & r=1,2,\ldots,N-1 \end{cases},$$

and having a guard band of time with a contiguous set of G zeros inserted between consecutive symbol intervals to produce a zero-padded sequence equal to $\vec{Y}'=C_{zp}\vec{Y}(i)$ where $C_{zp}=[I_N \, 0_{N\times G}]^T$ is an M×N zero-padding matrix, and $I_N$ is an N×N identity matrix, and $O_{N\times G}$ is an N×G matrix containing all zeros, the guard band having a time duration selected to substantially eliminate ISI between consecutive symbols after transmission over a channel; and
during each OFDM symbol interval, perform MMSE estimation to recover estimates of the data symbols.

16. The receiver of claim 15 adapted to perform demodulation of a one dimensional modulation scheme.

17. The receiver of claim 15 adapted to perform demodulation of a two dimensional modulation scheme.

18. A receiver comprising:
at least one antenna for receiving a signal, wherein the signal is a received version of a transmitted signal, the transmitted signal comprising a set of time domain samples for each OFDM symbol interval in which data symbols are mapped to a set of N orthogonal sub-carriers of the form $\cos(2\pi n F_A t)$ where n=0, 1, ..., N−1 and $0 \leq t < T$, where $N \geq 2$, $F_A$ is a frequency spacing between subcarriers, T is a time duration of each OFDM symbol interval, wherein the set of time domain symbols $\vec{Y}(i)$ equal $D^T \vec{X}(i)$ where $\vec{X}(i)$ are the data symbols, and wherein $D^T$ is the transpose of an N×N matrix with the element in the cth row and the rth column defined by $$D_{r,c} = \sqrt{\frac{2}{N}} \beta_r \cos\left(\frac{\pi r(2c+1)}{2N}\right)$$

for $0 \leq r \leq N-1$, and $0 \leq c \leq N-1$, where $$\beta_r = \begin{cases} 1/\sqrt{2}, & r = 0 \\ 1, & r = 1, 2, \ldots, N-1 \end{cases},$$

and having a guard band of time with a contiguous set of G zeros inserted between consecutive symbol intervals to produce a zero-padded sequence equal to $\vec{Y}'(i) = C_{zp} \vec{Y}(i)$ where $C_{zp} = [I_N \, 0_{N \times G}]^T$ is an M×N zero-padding matrix, and $I_N$ is an N×N identity matrix, and $O_{N \times G}$ is an N×G matrix containing all zeros, the guard band having a time duration selected to substantially eliminate ISI between consecutive symbols after transmission over a channel;
an estimator that during each OFDM symbol interval, recovers estimates of the data symbols from said signal by performing MMSE estimation in accordance with:

$$\hat{X}(i) = DH^H(HH^H + \sigma^2 I_M)^{-1} \vec{R}(i) \quad (13)$$
$$= D(H^H H + \sigma^2 I_N)^{-1} H^H \vec{R}(i)$$

where $I_M$ is an M×M identity matrix, $\hat{X}(i)$ is the MMSE estimate, $H = H_0 C_{zp}$, where $H_0$ is a channel matrix, and $C_{zp}$ is a zero padding matrix, D is a matrix representation of the discrete cosine transform, M is a sequence length including zero padding comprising a contiguous set of zeros having a length selected to substantially eliminate intersymbol interference (ISI) between consecutive OFDM symbols after transmission over a channel, and N is a sequence length not including zero padding, $(*)^H$ is a conjugate transpose operation, and $\sigma^2$ is an additive white noise Gaussian noise variance.

19. A method comprising:
receiving a signal over a channel wherein the signal is a received version of a transmitted signal, the transmitted signal comprising a set of time domain samples for each OFDM symbol interval in which data symbols are mapped to a set of N orthogonal sub-carriers of the form $\cos(2\pi n F_A t)$ where n=0, 1, ..., N−1 and $0 \leq t < T$, where $N \geq 2$, $F_A$ is a frequency spacing between subcarriers, T is a time duration of each OFDM symbol interval, wherein the set of time domain symbols $\vec{Y}(i)$ equal $D^T \vec{X}(i)$ where $\vec{X}(i)$ are the data symbols, and wherein $D^T$ is the transpose of an N×N matrix with the element in the cth row and the rth column defined by $$D_{r,c} = \sqrt{\frac{2}{N}} \beta_r \cos\left(\frac{\pi r(2c+1)}{2N}\right)$$

for $0 \leq r \leq N-1$, and $0 \leq c \leq N-1$, where $$\beta_r = \begin{cases} 1/\sqrt{2}, & r = 0 \\ 1, & r = 1, 2, \ldots, N-1 \end{cases},$$

and having a guard band of time with a contiguous set of G zeros inserted between consecutive symbol intervals to produce a zero-padded sequence equal to $\vec{Y}'(i) = C_{zp} \vec{Y}(i)$ where $C_{zp} = [I_N \, 0_{N \times G}]^T$ is an M×N zero-padding matrix, and $I_N$ is an N×N identity matrix, and $O_{N \times G}$ is an N×G matrix containing all zeros, the guard band having a time duration selected to substantially eliminate ISI between consecutive symbols after transmission over a channel;
during an OFDM symbol interval processing the signal received over the channel to recover estimates of data symbols;
wherein processing comprises performing MMSE estimation;
wherein the MMSE estimation is performed in accordance with:

$$\hat{X}(i) = DH^H(HH^H + \sigma^2 I_M)^{-1} \vec{R}(i) \quad (13)$$
$$= D(H^H H + \sigma^2 I_N)^{-1} H^H \vec{R}(i)$$

where $I_M$ is an M×M identity matrix, $\hat{X}(i)$ is the MMSE estimate, $H = H_0 C_{zp}$, where $H_0$ is a channel matrix, and $C_{zp}$ is a zero padding matrix, D is a matrix representation of the discrete cosine transform, M is a sequence length including zero padding comprising a contiguous set of zeros having a length selected to substantially eliminate intersymbol interference (ISI) between consecutive OFDM symbols after transmission over a channel, and N is a sequence length not including zero padding, $(*)^H$ is a conjugate transpose operation, and $\sigma^2$ is an additive white noise Gaussian noise variance.

\* \* \* \* \*